3,180,723
METALLURGICAL PROCESS
Thomas E. McCauley, Dearborn, Mich., assignor to Nalco Chemical Company, Chicago, Ill., a corporation of Delaware
No Drawing. Filed May 27, 1963, Ser. No. 283,615
24 Claims. (Cl. 75—5)

The instant invention is concerned with a method of refining and beneficiating minerals. More specifically, the present invention relates to an improved sinter process whereby recovered ore slurries and particularly, concentrated slurries of iron oxide ore are more advantageously employed in such process. The invention is also directed toward improving the efficiency of a method of concentrating mineral ore slurries via centrifugation techniques.

Of late, technological emphasis has been placed upon production of mineral pellets and particularly iron ore pellets which are subsequently fused into large masses or "clinkers" or are hardened in their integral state. These masses of sinter materials or integral pellets may then be subsequently used in operation of blast furnaces, and their use therein has resulted in immense increases in efficiency. Particularly, there is a decrease in emission of small particles of flue dust and a rapid transfer of the hot reducing gases throughout the entire dimension of the permeable bed of pellets or larger sinter masses which leads to such increased efficiency in the blast furnace operation.

The sinter burden, prior to its pelletization, generally is composed of various combinations of beneficiated lower grade iron ore deposits, "tailings" from iron ore processing, fines recovered from blast furnace flue gas, iron ore sludges, etc. To such materials may be added various substances, organic or inorganic, which promote binding. A calcium-carbonate containing material or flux material such as limestone is also added to the burden as well as a source of fuel such as coke. The latter is necessary to both fire and fuse the burden pellets when they pass through the sinter furnace. This mass of materials constituting what is known as a sinter burden, is then in a state ready for pelletization by means of such machinery as a disk or drum pelletizer. Generally, the burden is thrown upon the rotating inclined surface of the disk or drum pelletizer and compacted into pellets by virtue of the centrifugal force imparted to the burden by the revolving pelletizers. The resultant pellets are then fired and fused into large masses or into individual hardened pellet units. The size of the pellets generally determines choice of whether the individual pellets will be fused into masses. The smaller-sized pellets are generally selected for being formed into clinker masses comprising sinter material. In either case, whether the individual pellets are fused together into larger masses, or are maintained in their integral state, the resultant product may be usefully employed as blast furnace feed.

One convenient source of iron which may be used as burden material is an iron ore slurry whose solids generally comprise collected flue dust fines from previous blast furnace operations. These fines are usually caught in a water scrubbing tower and then concentrated in settling basins or clarifiers. Generally chemicals are added to the latter equipment to enhance solids coagulation and agglomeration. The now more highly concentrated material may then be further concentrated in thickening equipment such as a Dorr Thickener. These sludge or slurry materials are lastly processed and further concentrated by addition to centrifuge filters such as a Bird Centrifuge. Here the filtrate or clarified water is removed from the top of the centrifuge unit, and the now concentrated sludge or slurry cake is taken off from the bottom. This concentrated slurry is a convenient source material for use in subsequent pelletization and sintering, and, in fact, sometimes must be utilized in order to make the overall blast furnace operation economically practical.

A specific problem generally arises with respect to the use of the above-mentioned concentrated iron ore slurries as a portion of the sinter burden. Specifically, employing prior known centrifuge processes, a completely clean separation of aqueous filtrate from the resultant concentrated iron ore slurry cannot be accomplished. Generally, the aqueous filtrate contains a considerable amount of suspended iron ore particles upwards of 5% or more. This filtrate must then be reprocessed either by subsequent clarification, settling, etc., followed by more centrifugation, or is merely added to the input slurry feed and reprocessed in this manner. In either situation the total amount of slurry solids recovered per unit time and power expended, is considerably less than desired. The percent of recovered solids ranges from approximately 50% to about 70% by weight. Such inefficiency of course, is due to lack of clean separation of aqueous liquid filtrate from the concentrated slurry cake, and the remainder of the unrecovered solids are left suspended in the aqueous filtrate.

In view of the above, it is frequently not possible to supply the desired amount of concentrated slurry which can be usefully employed in a given sinter process. Attemps to obviate this problem by omitting one or more of the above enumerated concentration steps and thereby supply a less concentrated aqueous iron ore slurry, have also not been successful. It has been determined that for most efficient pelletization of the sinter burden the moisture content must be within certain narrow limits, generally thought to be about 8–16% of total weight, and more preferably between 8–12%. Thus, the amount of slurry which can be employed is necessarily limited according to its solids content. Attempting to supply a less highly concentrated aqueous iron ore slurry or sludge and avoid the above discussed deficiencies of concentration by centrifugation, results in deleteriously affecting the sinter process itself. Specifically, using a relatively dilute aqueous iron ore slurry tends to bring the overall moisture content of the burden beyond permissible limits. Excessively moist burden is difficultly pelletized, and pellets formed therefrom are more highly susceptible to attrition and crumble before firing and fusing.

Another problem occurring in prior art centrifugation of aqueous iron ore slurry input feed, is one of pollution of streams. If attempts are made to speed up the process by deliberately discarding filtrate containing a considerable amount of suspended iron ore solids, substantial water pollution occurs. Such objection combined with loss of what would otherwise be useful iron oxide solids, make such discard objectionable.

It would therefore be of considerable benefit to the art to discover a method whereby the efficiency of concentrating dilute iron ore slurries via centrifugation techniques, could be improved whereby the percentage of solids recovery is increased to a point greater than heretofore obtainable. It would be a considerable advantage if such concentration could be accomplished without resort to a separate process step or expense of additional concentrating equipment.

Specifically, considerable advantages would accrue if concentrated aqueous iron ore slurries could be supplied to a sinter process in greater amounts than now possible. If such could be achieved without sacrificing necessary high solids content of the sludge, and with employment of a more dilute feed slurries, greater efficiency of the overall process of recovery and reuse of blast furnace fines would result. If other advantages would accrue from the same process, such as increased green compression strength of the pellets formed from such concentrated aqueous iron ore slurries, even further efficiency would be achieved.

Lastly, if a method of increasing the efficiency of centrifugation were discovered whereby a more highly purified filtrate would be achieved, it would be a substantial advancement in the art, especially in increasing blast furnace operation effectiveness and minimizing water pollution problems. Full utilization of recovered iron ore sludge form could be realized and no resort need be had to discard of such sludge in ponds or other refuse areas. Iron ore dust and tailings would be thereby utilized to their fullest extent.

In view of the above it therefore becomes an object of the invention to provide an improved metallurgical refining process.

Another object of the invention is to provide a method for increasing the efficiency of a sinter process involving use of concentrated mineral ore slurries.

Yet another object of the invention is to provide a method of recovering slurry solids via centrifugation techniques in amounts unattainable by prior art processes.

A specific object of the invention is to provide an efficient method of centrifugation concentration of mineral ore slurries whereby the percent recovery of solids approaches theoretical recovery limits.

And yet another object is to provide a method of centrifugation and concentration of dilute mineral ore slurries such that the resultant filtrate is substantially free of suspended mineral ore solids.

Other objects will appear hereinafter.

In accordance with the invention an improved metallurgical method of sintering iron ore pellets has been discovered. The invention broadly comprises the steps of adding together finely divided iron ore, coke, a calcium carbonate-containing material, and, if desired, a binding substance used to impart cohesiveness to the resultant mass. Lastly, a concentrated aqueous iron ore slurry is added to the above whereby a wetted particulate mass is formed. This mass is then pelletized into integral "green" pellet units which are fired to a hardened state. Depending upon the size of the pellets, they may either be fused together in such firing step to form large masses or "clinkers," or they may be fused while maintaining their integral, individual state. The pellets or masses of agglomerated pellets are then used as a blast furnace feed. The specific improvement which forms the essence of the invention comprises supplying the above concentrated aqueous iron ore slurries in a form such that they contain a minor amount of an acrylamide polymer. This combination has been accomplished by first subjecting a less concentrated iron ore slurry feed to centrifugation in presence of a centrifugal aid comprising an acrylamide polymer. After such centrifugation has been effected, the thereby concentrated aqueous iron ore slurry, and acrylamide polymer which is carried along therewith, are separated from the freed aqueous filtrate liquid. Simultaneously, the aqueous filtrate liquid is also removed from the centrifuge. This filtrate is characterized as being substantially free from iron ore solids. The concentrated aqueous iron ore slurry containing acrylamide polymer is then employed in the sinter process as stated above.

By employing such a process of centrifugation in presence of acrylamide polymer, many advantages accrue. First, since the efficiency of recovery of solids is measurably increased in comparison to prior art methods involving no chemical addition, a greater amount of concentrated aqueous iron ore slurry may be supplied to the sinter process than heretofore. Also, the concentrated aqueous slurry so supplied containing a minor amount of acrylamide polymer, has the added advantage of promoting the cohesiveness and strength of the formed pellets in such sinter process. The acrylamide polymer carried through with the concentrate of aqueous iron ore slurry promotes such desirable results, and particularly increases the "green" or compression strength of the pellets to a point whereby they are able to withstand considerable attrition without crumbling into smaller units. By the term "sinter process" is meant the above discussed pellet forming process wherein the formed pellets are either fired and thereby fused into large masses or "clinkers," or are maintained in their integral individual unitary state.

The relatively dilute aqueous iron ore slurry feed introduced to the centrifuge filter may be supplied from many sources. One particularly preferred sludge material is that containing trapped flue dust from a blast furnace operation, which relatively dilute material has been previously concentrated by dewatering, clarification, thickening, etc., processes. Again, the concentration of the slurry feed to the centrifuge may vary over a wide range. However, for most efficient results it has been determined that the feed should contain at least 5% by weight of solids and more preferably at least 10%. In the most preferred form the sludge feed contains about 10 to about 25% of iron ore solids. Likewise, for most efficient use in subsequent employment as part of a sinter burden, the concentrated iron ore sludge should contain at least 40% solids and more preferably 50% by weight of solid material.

The more meaningful figures obtained in trials for evaluation of the instant invention, are efficiency values expressed in terms of percent recovery of solids. While prior art methods, involving no use of centrifuge aid, may well produce aqueous concentrated iron ore slurries of the same concentration as those produced by employing techniques of the instant invention, such prior art methods suffer glaring deficiency in not being able to reduce the percent of solids in the filtrate effluent below about 3–6% by weight and more generally not below about 4–5% by weight. Again, applying prior art methods one can not recover solids in an amount much above a total of 65% of the weight of the input solids. By following the concepts of the instant invention it is possible to reduce the percent solids in the effluent to a few hundreds of one percent, and likewise increase the percent recovery of solids even greater than 99%. Such advantages are apparent in that the filtrate may be directly discarded without need for subsequent further ore recovery processing to avoid waste. Also, because of its purity, the filtrate may be discarded without any fear of undesirable water pollution effects.

The construction of centrifuges used to concentrate the aqueous iron ore slurry may vary widely, depending upon the degree of separation desired, the initial concentration of solids in the slurry feed, the size of the solid particles, etc. For example, automatic and continuous basket centrifuges, conveyor-discharge centrifuges, tubular or disk-type centrifuges, continuous or automatic slurry discharge centrifuges, tubular or disk-type centrifuges involving a screen, or filter, etc., may be employed. Broadly speaking, the centrifuge may be one adapted to a continuous process or a batch technique. The former type is preferred where large operations are involved, with many tons of aqueous iron ore slurry being concentrated per day.

Excellent success has been noted in employment of a continuous centrifugal filter known as a Bird Centrifuge Filter. Broadly speaking this well-known centrifuge consists of two concentric drums mounted for rotation around a single horizontally disposed axis, and associated with means for rotating both drums in the same direction. The outer drum is known as the filter drum and the inner drum the conveying member. The slurry is generally introduced between the two drums and whirled against the inner wall of the outer drum which consists of a slotted plate. The cake is retained thereon and the filtrate passes through. The inner or conveying drum carries a series of discharge plows facing the outer drum, and rotates slightly slower than the outer filter drum. In this way the plows, which are helically disposed to act as a screw conveyor, scrape the deposited cake along the filtering surface toward the discharge. The filtrate and any wash waters, if employed, are collected separately. The cake by virtue of the centrifugal force and the discharge plows, reaches an annular discharge channel opening along a sector of the centrfuge drum casing and is thrown out into a chamber also provided in the casing. The slots in the plate forming the outer drum, are cut to dimensions appropriate to particle sizes of ore to be treated, and likewise, the diameter of the filter drum as well as its length and rotational speed may be varied considerably. The speed of the conveyor drum is dependent generally upon the gear ratio in the gear train assembly which is used to drive the drums. In some cases the capacity for larger machines of this type may be as much as 12 tons per hour.

Factors such as the centrifuge equipment employed, the degree of separation desired, the type and concentration of aqueous iron ore slurry involved as feed, whether or not the centrifuge process is a continuous or batch method, etc., determine the residence time of the solid particles being concentrated in the centrifuge itself. Such time may vary over a wide range from as little as one second to as long as many hours or even days in case of a batch process. In case of employment of a continuous centrifuge process, the residence time generally varies from about one second to five minutes. In the higher speed equipment, such time may be cut down so that the residence time varies from between one to sixty seconds.

The centrifuge aid comprising an acrylamide polymer is a well-known material and needs no specific detailed discussion. A particularly suitable polymer is available as "Nalcolyte 670." It is characterized by its non-ionic character, water solubility, molecular weight in excess of one million, density of 43 pounds/ft.$^3$, 258° C. decomposition point and viscosity of 200 cps. in 1% aqueous solution at pH 7, 70° F. Both the homopolymer of acrylamide and its copolymers may be employed, as long as in the latter case, the acrylamide is the predominant mer unit in the polymer molecule. The polymers should also be water soluble. The term "acrylamide polymer" is intended to define any polymers of this just outlined type. Any one or more polymerizable ethylenically unsaturated comonomers may be added to the acrylamide monomer and suitably interpolymerized to form useful copolymeric centrifuge aids. It is preferred that such comonomers be hydrophilic in nature. Typical comonomers which may be employed are acrylic acid, alkyl esters of arcylic acid such as methyl acrylate, etc., salts of acrylic acid and particularly alkaline earth and alkali metal salts such as sodium acrylate, magnesium acrylate, etc., as well as diethylamine acrylate. Likewise, compounds such as acrolein, methacrylic acid, methacrylamide, acrylonitrile, methacrylonitrile, maleic acid and derivatives thereof, such as esters, salts, etc., vinyl sulfomic and vinyl phosphonic acids may be used. Other compounds that may be employed include trimethylamine methacrylate, diethyl methylamine succinate, methyl isopropenyl ketone, ethyl vinyl ketone, vinyl acetate, vinyl pyrrolidone, allyl alcohol, sulfonated styrene, vinyl pyridine, maleic anhydride, sodium maleate, N-allyl amines, vinyl sulfonic salts, allyl amines and various other ethylenically unsaturated compounds having a wide variety of hydrophilic radicals. The most preferred compound is polyacrylamide itself. The molecular weights of such homo- or interpolymers comprising useful centrifuge aids may be varied over considerable ranges. Most preferably, the molecular weight of such polymers ranges from 50,000 to about 10 million. The most preferred substance is polyacrylamide of an extremely high molecular weight as produced according to the process described in copending, commonly assigned application having a Serial No. 132,562, filed August 21, 1961. This application is herein incorporated by reference. Acrylamide polymers produced according to the techniques set forth therein have proved to be exceptional in promoting the efficiency of the centrifuge process to a point where at least 99% of solids are recovered and the solids content in the effluent filtrate is well below 1%.

For best results, the input dilute slurry feed is treated with the acrylamide polymer centrifuge aid at a point near about the point of introduction of dilute slurry feed into the centrifuge. It is understood, of course, that treatment of the input slurry feed at such a point also includes the concept of introducing the centrifuge aid into the centrifuge simultaneously with introduction of input slurry feed. Thus, in one embodiment the centrifuge aid may be fed by means of a meter line supplying the centrifuge input line containing the dilute slurry feed. In this fashion, treated slurry feed containing centrifuge aid may be introduced into the centrifuge. For convenience sake, such a method of treatment of slurry feed will be referred to as external feeding of centrifuge aid.

Likewise, the dilute slurry feed and centrifuge aid may respectively be directly introduced into the centrifuge via separate lines. It is only necessary in the practices of the invention, that the centrifugation process be carried out in the presence of the acrylamide polymer. This method of feeding may be designated as internal feeding.

The amount of centrifuge polymer aid employed may be varied over a considerable range. For good results, it has been determined that at least 0.1 pound of acrylamide polymer should be present during the centrifugation for each ton of slurry solids. Better results are obtained when at least 0.5 pound of acrylamide polymer are present. Optimum efficiency is obtained when from about 0.5 pound per ton to about 10.0 pounds per ton of slurry solids are present.

It is apparent that while the above-described process was discussed with particular reference to iron ore slurries, it may be likewise adapted to concentration of any dilute aqueous mineral ore slurry. For example, copper, nickel, titanium, uranium, etc., slurries may be usefully concentrated in presence of the acrylamide polymer centrifuge aid whereby the above discussed benefits are achieved.

In a midwestern steel mill, tests were run to determine the efficacy of the invention and improvement realized through use of the acrylamide polymer centrifuge aids. Table I shows the results of these tests. The particular centrifuge unit involved was a Bird Centrifugal Filter of the continuous type, having a type construction as detailed above. In this case the centrifuge had a bowl diameter of 40", a centrifuge area length of 60", a gear ratio of 80:1, and a rated capacity of 10.0 cu.ft./min. The centrifuging bowl speed was about 1200 r.p.m. Residence time of the solid particles in the centrifuge was approximately 30 seconds.

An inspection of the results reveals that only through the practices of the instant invention, involving addition of acrylamide polymer as a centrifuge aid, could the solids content in the effluent be reduced to the point where they could be discarded without further clarification. Likewise, the percent recovery of solids based on original solids fed in was exceptionally high when the centrifuge aid was present. In both external and internal addition of acrylamide polymer, good results were obtainable. The particular acrylamide polymer used in each case was one produced according to the techniques outlined in the previously cited copending application. This polymer had an exceptionally high molecular weight believed to be in excess of one million. The various amounts of polyacrylamide were metered through pumps and fed either to the centrifuge machine itself or input line containing slurry feed at concentrations of 0.05 to 0.25% by weight of polymer in aqueous solutions. In each run involving use of centrifuge aid, the percentage recovery of solids was remarkably efficient. It is noted that the percentage recovery of solids and low amount of effluent solids are proportional to the amount of polymer employed as an aid to the centrifugation.

Thus, not only were substantially increased amounts of highly concentrated iron ore slurry obtained having a sufficient solids content to be suitably employed in a subsequent sinter process, but also the aqueous effluent could be discarded or used for other purposes as in heat exchangers without further purification. In essence then, more iron ore solids were available for subsequent pelletization and sintering than heretofore obtainable by prior art methods involving no centrifuge aid.

TABLE I

*Slurry concentration tests*

| Run No. | 1 | 2 | 3 | 4 | 5 |
|---|---|---|---|---|---|
| Feed Temp., °F | 90 | 90 | 90 | 90 | 90 |
| Feed, Sp. Gr | 1.14 | 1.14 | 1.14 | 1.11 | 1.11 |
| Percent Solids in Feed | 14.5 | 14.5 | 13.8 | 13.0 | 13.0 |
| Percent Solids in Cake | 60 | 64.2 | 51.7 | 57.0 | 57.0 |
| Percent Solids in Effluent | 5.82 | 0.20 | 0.40 | 0.008 | 0.013 |
| Percent Recovery of Solids | 66.0 | 98.3 | 97.5 | 99.9 | 99.9 |
| Point of Introduction | | ¹E | E | ¹I | I |
| Pounds of Centrifuge Aid Per Ton of Solids | 0 | 0.9 | 1.1 | 2.8 | 2.8 |

| Run No. | 6 | 7 | 8 | 9 | 10 | 11 |
|---|---|---|---|---|---|---|
| Feed Temp., °F | 90 | 90 | 90 | 90 | 90 | 90 |
| Feed, Sp. Gr | 1.11 | 1.11 | 1.11 | 1.11 | 1.11 | 1.11 |
| Percent Solids in Feed | 12.8 | 12.4 | 12.4 | 12.4 | 13.7 | 13.7 |
| Percent Solids in Cake | 57.0 | 61.0 | 61.0 | 61.0 | 57.5 | 57.5 |
| Percent Solids in Effluent | 0.019 | 1.04 | 1.38 | 2.20 | 2.30 | 1.96 |
| Percent Recovery of Solids | 99.8 | 91.7 | 88.9 | 82.7 | 84.9 | 87.1 |
| Point of Introduction | ¹E | ¹I | I | I | I | I |
| Pounds of Centrifuge Aid Per Ton of Solids | 2.6 | 1.4 | 1.4 | 1.1 | 0.5 | 0.5 |

| Run No. | 12 | 13 | 14 | 15 |
|---|---|---|---|---|
| Feed Temp., °F | 90 | 88 | 90 | 90 |
| Feed, Sp. Gr | 1.11 | 1.12 | 1.12 | 1.12 |
| Percent Solids in Feed | 13.9 | 15.8 | 13.7 | 13.7 |
| Percent Solids in Cake | 57.5 | 59 | 65 | 65 |
| Percent Solids in Effluent | 1.81 | 2.44 | 4.48 | 0.016 |
| Percent Recovery of Solids | 88.0 | 87.5 | 66.3 | 99.86 |
| Point of Introduction | ¹I | I | I | I |
| Pounds of Centrifuge Aid Per Ton of Solids | 0.5 | 1.4 | 0 | 2.8 |

| Run No. | 16 | 17 | 18 | 19 |
|---|---|---|---|---|
| Feed Temp., °F | 90 | 90 | 90 | 90 |
| Feed, Sp. Gr | 1.12 | 1.12 | 1.12 | 1.12 |
| Percent Solids in Feed | 13.7 | 13.7 | 13.7 | 13.7 |
| Percent Solids in Cake | 65 | 65 | 65 | 65 |
| Percent Solids in Effluent | 0.017 | 0.02 | 0.026 | 0.035 |
| Percent Recovery of Solids | 99.85 | 99.82 | 99.75 | 99.67 |
| Point of Introduction | ¹I | I | I | I |
| Pounds of Centrifuge Aid Per Ton of Solids | 2.8 | 2.8 | 1.9 | 1.9 |

¹ E = external feeding; I = internal feeding.

It is not exactly clear in what manner the centrifuge aid assists in increasing the efficiencies of the centrifugation process. It is surprising that the polymer was able to be of such assistance in view of the tremendous shearing which occurs in such centrifuging operations.

Obviously, many modifications and variations of the invention as hereinbefore set forth may be made without departing from the spirit and scope thereof, and therefore only such limitations should be imposed as are indicated in the appended claims.

The invention is hereby claimed as follows:

1. In a metallurgical method of sintering iron ore pellets which comprises the steps of adding together finely divided iron ore, coke, a calcium carbonate-containing material, and a concentrated aqueous iron ore slurry whereby a wetted particulate mass is formed, pelletizing said mass to form integral units and firing said formed pellet units to a hardened state; the improvement which comprises combining with said concentrated aqueous iron ore slurry a minor amount of an acrylamide polymer, said combination having been accomplished by first subjecting a less concentrated aqueous iron ore slurry feed to centrifugation in presence of a centrifuge aid comprising said acrylamide polymer, thereafter separating the more concentrated aqueous iron ore slurry from the freed aqueous filtrate liquid and removing from the system said aqueous liquid filtrate in a form substantially free from iron ore solids.

2. The method of claim 1 wherein said feed contains at least 5.0% by weight of solids and said concentrated slurry contains at least 40.0% by weight of solids.

3. The method of claim 1 wherein said centrifuge aid is present in an amount of at least 0.5 lb./ton of solids present in said slurry.

4. The method of claim 1 wherein said slurry concentration is carried out by a continuous process centrifuge with the residence time of slurry in said centrifuge being from about one second to about five minutes.

5. In a metallurgical method of sintering iron ore pellets which comprises the steps of adding together finely divided iron ore, coke, a calcium carbonate-containing material, and a concentrated aqueous iron ore slurry whereby a wetted particulate mass is formed, pelletizing said mass to form integral units and firing said pellet units to a hardened state; the improvement which comprises combining said concentrated iron ore slurry with a minor amount of an acrylamide polymer, said combination having been accomplished by treating a less concentrated aqueous iron ore slurry feed with a centrifuge aid comprising said acrylamide polymer, subjecting the thus treated feed to centrifugation in presence of said aid, thereafter separating the more concentrated aqueous iron ore slurry from the freed aqueous filtrate liquid and removing from the system said aqueous liquid filtrate in a form substantially free from iron ore solids.

6. In a metallurgical method of sintering iron ore pellets which comprises the steps of adding together finely divided iron ore, coke, a calcium carbonate-containing material, and a concentrated aqueous iron ore slurry whereby a wetted particulate mass is formed, pelletizing said mass to form integral units and firing said formed pellet units to a hardened state; the improvement which comprises combining said concentrated aqueous iron ore slurry with a minor amount of an acrylamide polymer, said combination having been accomplished by simultaneously adding a less concentrated aqueous iron ore slurry feed and a centrifuge aid comprising said acrylamide polymer to a centrifuge, subjecting said iron ore feed to centrifugation in presence of said centrifuge aid, thereafter separating the more concentrated aqueous iron ore slurry from the freed aqueous filtrate liquid, and removing from the system said aqueous liquid filtrate in a form subsubstantially free from iron ore solids.

7. A metallurgical process for improving the usefulness of a concentrated aqueous mineral ore slurry as a burden component in a sinter process and for increasing the amount of slurry solids recovered from a relatively dilute aqueous mineral ore slurry, which comprises the steps of treating said dilute slurry at a point near about the point of its introduction into a centrifuge with a centrifuge aid comprising an acrylamide polymer, subjecting said dilute slurry in the presence of said centrifuge aid to sufficient centrifugal force to separate concentrated slurry solids from an aqueous liquid filtrate, collecting the thereby concentrated mineral slurry, and removing from the system said aqueous liquid filtrate in a form substantially free from mineral ore solids.

8. The method of claim 7 wherein the mineral ore slurry so concentrated is an iron core slurry.

9. The method of claim 7 wherein said dilute mineral ore slurry contains at least about 5.0% solids by weight and said concentrated mineral slurry contains at least about 40% by weight of solids.

10. The method of claim 7 wherein said centrifuge aid is added in an amount of at least 0.5 lb./ton of slurry solids.

11. The method of claim 7 wherein said centrifugation is a continuous process and the residence time of slurry in said centrifuge is from about one second to about five minutes.

12. A metallurgical process for improving the usefulness of a concentrated aqueous iron ore slurry as a burden component in a sinter process and for increasing the amount of slurry solids recovered from a relatively dilute aqueous iron ore slurry, which comprises the steps of treating a dilute iron ore slurry with a centrifuge aid comprising an acrylamide polymer, adding the thus treated dilute slurry to a centrifuge, subjecting said dilute slurry in the presence of said centrifuge aid to sufficient centrifugal force to separate the concentrated slurry solids from an aqueous liquid filtrate, collecting the thereby concentrated iron ore slurry, and removing from the system said aqueous liquid filtrate in a form substantially free from iron ore solids.

13. The method of claim 12 wherein said dilute iron ore slurry contains at least 5.0% by weight of solids and said concentrated iron ore slurry contains at least 40% by weight of solids.

14. The method of claim 12 wherein at least 0.5 lb. of centrifuge aid are added to said dilute slurry per ton of slurry solids.

15. The method of claim 12 wherein said centrifugation is carried out as a continuous process, and the residence time of said slurry in said centrifuge varies from about one second to about five minutes.

16. The method of claim 12 wherein sufficient centrifuge aid is present to effect a solids recovery of at least 85%.

17. A metallurgical process for improving the usefulness of a concentrated aqueous iron ore slurry as a burden component in a sinter process and for increasing the amount of slurry solids recovered from a relatively dilute aqueous iron ore slurry, which comprises the steps of adding simultaneously a dilute input slurry feed and a centrifuge aid comprising an acrylamide polymer to a centrifuge, subjecting said dilute slurry in presence of said centrifuge aid to sufficient centrifugal force to separate concentrated slurry solids from an aqueous liquid filtrate, collecting the thereby concentrated iron ore slurry and removing from the system said aqueous liquid filtrate in a form substantially free from iron ore solids.

18. The method of claim 17 wherein said dilute slurry contains at least about 5.0% by weight of solids and said concentrated iron ore slurry contains at least 40% by weight of solids.

19. The method of claim 17 wherein at least 0.5 tons of centrifuge aid are added to said centrifuge for each ton of slurry solids.

20. The method of claim 17 wherein said centrifugation is run in a continuous manner and the residence time of slurry in said centrifuge varies from about one second to about five minutes.

21. The method of claim 17 wherein sufficient centrifuge aid is present whereby the percent recovery of solids is at least 85%.

22. The method of claim 7 wherein said aqueous liquid filtrate contains less than 3.0% by weight of solids.

23. The method of claim 12 wherein said aqueous liquid filtrate contains less than 3.0% by weight of solids.

24. The method of claim 17 wherein said aqueous liquid filtrate contains less than 3.0% by weight of solids.

References Cited by the Examiner
UNITED STATES PATENTS

| | | | |
|---|---|---|---|
| 1,826,183 | 10/31 | Lehrecke | 75—5 |
| 2,810,633 | 10/57 | Cooper | 75—5 |

FOREIGN PATENTS 533,975   12/56   Canada.

BENJAMIN HENKIN, *Primary Examiner.*

UNITED STATES PATENT OFFICE
CERTIFICATE OF CORRECTION

Patent No. 3,180,723                  April 27, 1965

Thomas E. McCauley

It is hereby certified that error appears in the above numbered patent requiring correction and that the said Letters Patent should read as corrected below.

Column 3, line 10, for "sludge" read -- in sludge --; column 5, line 55, for "sulfomic" read -- sulfonic --; column 8, line 54, for "subsubstantially" read -- substantially --; same column 8, line 71, for "core" read -- ore --.

Signed and sealed this 26th day of October 1965.

(SEAL)
Attest:

ERNEST W. SWIDER
Attesting Officer

EDWARD J. BRENNER
Commissioner of Patents